M. D. STOCKING.
SUPPLEMENTAL WHEEL FOR MOTOR CARS.
APPLICATION FILED FEB. 3, 1908.

904,570.

Patented Nov. 24, 1908.

Witnesses:
J. S. Clark
E. Behel

Inventor:
Milton D. Stocking
By A. O. Behel
Atty.

UNITED STATES PATENT OFFICE.

MILTON D. STOCKING, OF LINDENWOOD, ILLINOIS.

SUPPLEMENTAL WHEEL FOR MOTOR-CARS.

No. 904,570.     Specification of Letters Patent.     Patented Nov. 24, 1908.

Application filed February 3, 1908. Serial No. 414,107.

*To all whom it may concern:*

Be it known that I, MILTON D. STOCKING, a citizen of the United States, residing at Lindenwood, in the county of Ogle and State of Illinois, have invented certain new and useful Improvements in Supplemental Wheels for Motor-Cars, of which the following is a specification.

The object of this invention is to provide means for uniting a supplemental wheel to the main wheel of a motor car, and in producing means for preventing the displacement or loosening of the holding means.

The further object of this invention is to provide an adjustable bushing to be located around the hub of the main wheel and over which the supplemental wheel is placed, in order to make a close fitting joint of the supplemental wheel therewith.

Figure 1:
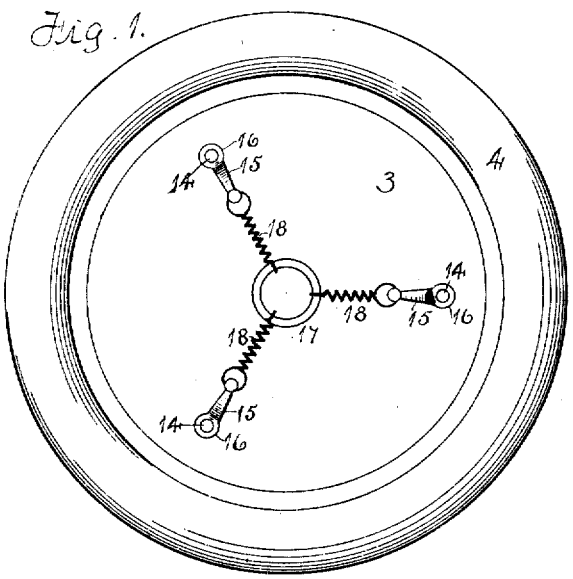
Figure 2:
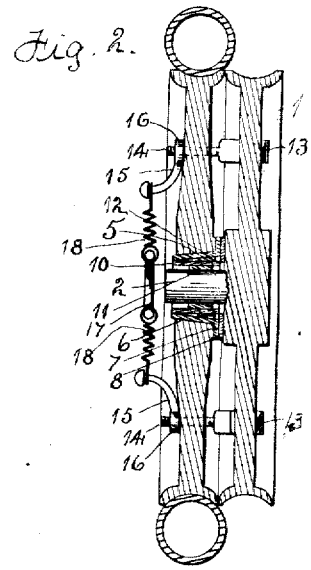
Figure 3:
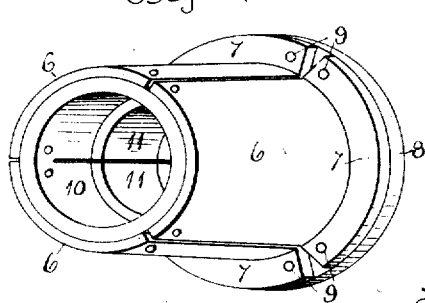
Figure 4:
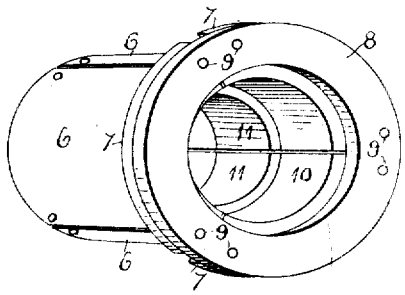
Figure 6:
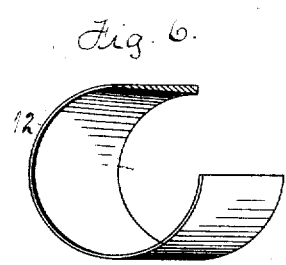
Figure 5:
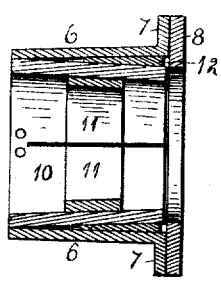
Figure 7:
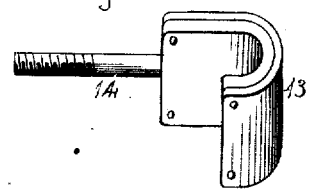

In the accompanying drawings, Figure 1 is a face representation of the supplemental wheel. Fig. 2 is a transverse section of the supplemental wheel in its connection with the main wheel. Fig. 3 is a perspective view of the bushing as seen from its smaller end. Fig. 4 is a perspective view of the bushing as seen from its enlarged end. Fig. 5 is a longitudinal section through the bushing. Fig. 6 is a sectional view of the removable packing. Fig. 7 is a view of one of the screw-threaded hooks for connecting the wheels.

The main wheel 1 is of the usual spoke construction and provided with the hub 2. The supplemental wheel 3 supports the tire 4, and has a central tapered opening 5. A bushing is adapted to be placed over the hub 2 of the main wheel and in this instance is in three equal metallic sections 6 each having an outturned flange 7. A ring 8 of yielding material, for instance rubber or leather is united to the outturned flanges 7 of the metallic sections by the rivets 9, as shown at Figs. 3 and 4. To the inner face of the metallic sections 6 is secured at the smaller end thereof, a yielding packing 10, for instance, rubber or leather. To the inner surface of each of the packings 10 is attached a yielding section 11. The ends of the packing 10 nearest the ring 8, are not attached to the metallic sections 6, in order that a tapered strip 12 of yielding material may be placed between them and the metallic sections 6 as shown at Fig. 5. The object in placing the strip 12 in such position is to fill in around the hub of the main wheel, should the hub be of such outward conformation as to require it. This bushing being located on and fitted to the hub of the main wheel, the ring 8 will rest against the outer face of the main wheel adjacent to the hub, and prevents the marring of the finish of the main wheel.

The supplemental wheel is placed over the bushing and owing to the tapered form of the metallic sections 6 and the tapered form of the inner face of the central opening 5 of the supplemental wheel, the supplemental wheel will receive a close fit owing to the flexibility of the packing in its connection with the hub of the main wheel.

A number of hooks 13, each have a screw-threaded shank 14, the shanks being placed through openings in the supplemental wheel, and the flat hooked ends placed in engagement with the spokes of the main wheel, whereupon cranks 15 each having an end 16 with a screw-threaded opening are turned on the projecting screw-threaded shanks 14 until the supplemental wheel is brought into close relation with the main wheel 1, as shown at Fig. 2. A ring 17 has as many coiled springs 18 connected to it as there are cranks 15, and after the cranks are properly turned up, a spring 18 is connected to a crank as shown at Fig. 1. The cranks will all radiate toward the center of the supplemental wheel, and the springs 18 will prevent the cranks turning loose by the jar of the supplemental wheel over the roads. The object of this supplemental wheel is to support that portion of the load carried by the main wheel which has become disabled, and this is accomplished without removing the main wheel.

I claim as my invention.

1. A supplemental wheel for motor cars adapted to have an engagement with the hub of one of the main wheels of a car and connected to the main wheel by devices having screw-threaded shanks, and a crank for each shank and having an end with a screw-threaded opening.

2. A supplemental wheel for motor cars adapted to have an engagement with the hub of one of the main wheels of a car and connected to the main wheel by devices having screw-threaded shanks, a crank for each shank and having a screw-threaded end, and means for tying the cranks together to prevent their unturning.

3. A supplemental wheel for motor cars adapted to have an engagement with the hub of one of the main wheels of a car, and connected to the main wheel by devices having screw-threaded shanks, a crank for each shank and having a screw-threaded end, a ring, and a spring for each crank and having a connection with the ring.

4. A supplemental wheel for motor cars having a central opening, a sectional bushing for the opening, and a ring connected to the sections.

5. A supplemental wheel for motor cars, having a central opening, a sectional bushing for the opening and a ring of yielding material connecting the sections.

6. A supplemental wheel for motor cars having a central opening, a sectional bushing for the opening, a ring connecting the sections and a packing for the inner face of each section.

7. A supplemental wheel for motor cars having a central opening, a sectional bushing for the opening, a ring connecting the sections, a packing for the inner face of each section and connected to the outer end of the sections, the inner end of the packing being free, and a strip adapted to be placed around the free ends of the packings for the metallic sections.

8. A supplemental wheel for motor cars having a central opening, a sectional bushing for the opening, a ring connecting the sections, a packing for the inner face of each section and connected to the outer end of the sections, the inner end of the packing being free, a strip adapted to be placed around the ends of the packings for the metallic sections, and additional packing secured to the inner face of the packings of the sections.

9. A supplemental wheel for motor cars adapted to have an engagement with the hub of one of the main wheels of a car by hooks, the hooks having a flat surface for engagement with the spokes of the main wheel, and cranks having a screw-threaded connection with the shanks of the hooks.

10. A supplemental wheel for motor cars having a central opening, a metallic sectional bushing for the opening, the sections provided with a flexible lining which is fixedly connected to the metallic sectional bushing.

In testimony whereof I have hereunto set my hand in presence of two subscribing witnesses.

MILTON D. STOCKING.

Witnesses:
A. O. BEHEL,
E. D. E. N. BEHEL.